(12) United States Patent
Krug-Kussius

(10) Patent No.: US 7,380,491 B2
(45) Date of Patent: Jun. 3, 2008

(54) FLOW VALVE AND FLOW DISTRIBUTOR COMPRISING SEVERAL FLOW VALVES

(75) Inventor: Karl Krug-Kussius, Karsbach (DE)

(73) Assignee: Bosch Rexroth AG, Stuttgart (DE)

( * ) Notice: Subject to any disclaimer, the term of this patent is extended or adjusted under 35 U.S.C. 154(b) by 203 days.

(21) Appl. No.: 10/583,155

(22) PCT Filed: Dec. 29, 2004

(86) PCT No.: PCT/EP2004/014800

§ 371 (c)(1),
(2), (4) Date: Jun. 16, 2006

(87) PCT Pub. No.: WO2005/066505

PCT Pub. Date: Jul. 21, 2005

(65) Prior Publication Data

US 2007/0131107 A1    Jun. 14, 2007

(30) Foreign Application Priority Data

Jan. 7, 2004  (DE) .................. 10 2004 001 253
Mar. 3, 2004  (DE) .................. 10 2004 010 374

(51) Int. Cl.
*F15B 11/16*  (2006.01)
*F16H 61/00*  (2006.01)
(52) U.S. Cl. .......................... 91/515; 60/426
(58) Field of Classification Search .......... 60/422, 60/426; 91/514, 515
See application file for complete search history.

(56) References Cited

U.S. PATENT DOCUMENTS

| | | | | |
|---|---|---|---|---|
| 4,121,601 A | * | 10/1978 | Presley | ................ 137/101 |
| 4,766,727 A | * | 8/1988 | Dull et al. | ................ 60/427 |
| 5,460,000 A | | 10/1995 | Kropp | |
| 5,560,204 A | * | 10/1996 | Ishihama et al. | ............. 91/515 |
| 5,647,211 A | * | 7/1997 | Harber et al. | ................ 91/514 |
| 5,752,384 A | | 5/1998 | Schmitt et al. | |
| 6,289,675 B1 | | 9/2001 | Weickert et al. | |
| 6,289,917 B1 | * | 9/2001 | Gerstenberger | ............. 91/515 |
| 6,367,365 B1 | | 4/2002 | Weickert et al. | |
| 6,651,688 B2 | * | 11/2003 | Brand et al. | ................. 91/515 |
| 6,874,526 B2 | * | 4/2005 | Koetter | ................ 91/446 |

FOREIGN PATENT DOCUMENTS

| | | |
|---|---|---|
| DE | 12 22 376 | 8/1966 |
| DE | 22 60 457 | 6/1974 |
| DE | 93 18 522 U1 | 12/1993 |
| DE | 195 31 497 A1 | 2/1997 |

(Continued)

*Primary Examiner*—Thomas E Lazo
(74) *Attorney, Agent, or Firm*—Oliff & Berridge, PLC

(57) ABSTRACT

There is disclosed a flow valve and a flow distributor for the pressure fluid supply of several consumers. Each flow valve includes a metering orifice and a pressure regulator. A pressure regulator piston of the pressure regulator is provided with two control edges one of which is active during "accumulating" of pressure fluid flows and the other is active during "dividing" of a pressure fluid flow. The flow valve moreover comprises at least one LS control edge by which a LS cross-section via which a pressure corresponding to the load pressure is indicated into a load-indicating line can be controlled to be opened when the pressure regulator is opened.

13 Claims, 9 Drawing Sheets

FOREIGN PATENT DOCUMENTS

| | | |
|---|---|---|
| DE | 100 58 032 A1 | 5/2002 |
| EP | 1 088 995 A1 | 4/2001 |
| WO | WO 95/32364 | 11/1995 |
| WO | WO 98/34031 | 8/1998 |
| WO | WO 00/00747 | 1/2000 |

* cited by examiner

FLOW VALVE AND FLOW DISTRIBUTOR COMPRISING SEVERAL FLOW VALVES

The invention relates to a flow valve for a flow distributor for the pressure fluid supply of several hydraulic consumers in accordance with the preamble of claim 1 as well as to a flow distributor comprising flow valves of such type.

Hydraulic flow distributors ensure that a given pressure fluid flow flows in desired partial quantities via several hydraulic consumers or hydraulic loads arranged in parallel to each other independently of the load pressure. If the pressure fluid flow is directed such that the individual flow valves of the flow distributor are disposed upstream of the hydraulic consumers, one speaks of the operating state of dividing. If, however, the individual flow valves are arranged downstream of the hydraulic consumers, one speaks of the operating state of accumulating.

Each flow valve of a flow distributor includes a metering orifice and a pressure regulator which upon dividing is disposed downstream of the metering orifice. Upon dividing the pressure regulators are loaded with the maximum load pressure in the closing direction and restrict the fluid flow between the respective metering orifice and the load so strongly that the pressure after all metering orifices is equal to the maximum load pressure or is slightly above the latter. As regards this arrangement and the pressure application of the pressure regulators, a flow distributor is similar to a so-called LUDV (load-pressure independent flow distribution) control, as it is shown, for instance, in WO 95/32364 which is a special case of a load sensing control. In the case of such control the maximum load pressure is indicated to a variable-displacement pump and the latter is controlled such that in the pump piping a pump pressure lying above the load pressure by a predetermined pressure difference Äp is prevailing. In the event of a LUVD control the division of the individual partial flows is maintained even when the pump pressure drops. For in this case of a so-called undersupply nothing is changed about the pressure downstream of the metering orifices. Ahead of all metering orifices the dropped pump pressure is applied so that the pressure difference has varied in the same way at all metering orifices.

Flow distributors can be used irrespective of whether a constant pump or a variable-displacement pump is used as pressure fluid source and of how the variable-displacement pump is adjusted. When used in a traveling drive, the discharge rate is adjusted, for instance, in response to the deflection of a joystick or a pedal and is then apportioned to the hydraulic consumers in the desired volume ratios by the flow distributor.

An "accumulating of partial quantities of pressure fluid" cannot be performed by the control according to WO 95/32364. For, upon accumulating it has to be ensured that no longer the maximum pressure but the minimum pressure of the pressures prevailing between pressure regulators and consumer is applied in the closing direction to the pressure regulators, wherein here the pressure prevailing at the maximum-load consumer is the lowest one.

A flow distributor for dividing and accumulating is known from DE 195 31 497 A1. In such a control arrangement the pressure regulators allocated to the consumers are biased via centering springs into an open position, wherein in the operating state of "dividing" the maximum load pressure is applied to them and in the operating state of "accumulating" the respective minimum effective load pressure is applied to them via a pilot valve so that in both operating states the pressure loss above the metering orifices can be kept constant independently of the load pressure.

What is a drawback in this known solution is the fact that the pilot valve has to be controlled corresponding to the operating state and that a considerable expenditure on apparatuses for tapping off the maximum and/or the minimum load pressure is required.

On the other hand, the object underlying the invention is to provide a flow valve as well as a flow distributor composed of such flow valves in which the operating states of "dividing" and "accumulating" can be realized at minimum expenditure.

This object is achieved, as regards the flow valve, by the features of claim 1 and, as regards the flow distributor, by the features of claim 13.

The flow valve according to the invention allocated to a respective consumer includes a metering orifice and a pressure regulator which regulates on the one side of the metering orifice the maximum or minimum load pressure. According to the invention, a pressure regulator piston of the pressure regulator is designed to have to control edges one of which is allocated to the operating state of "accumulating" and the other is allocated to the operating state of "dividing". The flow valve moreover includes a LS control edge via which a LS cross-section can be controlled to be opened when the pressure regulator is completely opened for indicating a load into a LS line. When the LS cross-section is controlled to be opened, the pressure can be tapped off in a pressure fluid flow path between the metering orifice and the inlet of the pressure regulator. This pressure corresponds at a first approach to the load pressure prevailing at the allocated consumer when the pressure regulator is completely opened. This is the case upon "dividing" with the consumer guiding the maximum load pressure, because the pressure regulator of the flow valve allocated to this consumer is completely opened, while the pressure regulators of the other flow valves allocated to lower-load consumers are shifted to control positions for restricting the initial pressure downstream of the metering orifices to the lower load pressure of these consumers.

In the operating state of "accumulating" the pressure in the a.m. pressure fluid flow path substantially corresponds to that of the minimum load consumer, wherein the smallest amount of pressure fluid at the beginning of the control flows to the pressure regulator thereof and the latter is opened or remains open, while the pressure in the pressure fluid flow path is restricted by the pressure regulators of the other higher-load consumers, until a balance of forces is brought about above the pressure regulator piston.

In accordance with the invention, it is thus changed over automatically between "dividing" and "accumulating", wherein the change-over is performed by tapping off a pressure corresponding to the maximum load pressure ("dividing") and, resp., a pressure corresponding to the minimum load pressure ("accumulating") in the pressure fluid flow path between the opened pressure regulator and the metering orifice. In the flow valves of the higher-load and the lower-load consumers, resp., the LS cross-section is controlled to be closed so that at a control surface the respective pressure regulators are loaded with the pressure corresponding to the maximum load pressure ("dividing") in the closing direction and with the pressure corresponding to the minimum load pressure ("accumulating") in the opening direction.

In an especially preferred solution the pressure regulator of the flow valve is opened in the home position.

The LS cross-section can be controlled to be opened via a 2/2 port directional control valve having two LS control edges one of which is allocated to "accumulating" and the other is allocated to "dividing".

In a particularly compact variant of the invention the directional control valve is integrated in a pressure regulator piston, an internal piston of the directional control valve being guided in a guiding bore of the pressure regulator piston and including a control collar at both annular end faces of which the two aforementioned LS control edges are formed.

The internal piston is actuated (change-over of the directional control valve) by applying the pump pressure to an end face and the LS pressure applied to the LS line to the other end face. Upon "dividing" the internal piston is then shifted by the high pump pressure into a first switching position and upon "accumulating" it is shifted into another switching position due to the lower pump pressure, in each of the positions one of said LS control edges being effective to open the LS cross-section by control.

In the case of such a solution it is preferred when the LS line opens into a LS spring chamber of the pressure regulator, wherein a communication between the spring chamber and a passage guiding the pressure corresponding to the load pressure is brought about by opening the LS cross-section by control.

In the case of an advantageous variant of the invention, the pressure regulator includes a further spring chamber communicated with the LS spring chamber via a communicating passage extending along the outer circumference of the internal piston.

The structure of the flow valve can be further facilitated when the internal piston extends beyond the LS spring chamber and a guiding collar is formed at said end portion guided out of the pressure regulator, said guiding collar being guided in a pressure chamber of a screw plug of the flow valve. In this pressure chamber a stop is formed for the internal piston and moreover the pump pressure is applied to the same.

For a better guiding the internal piston may include a radial collar which is adjacent along the inner circumferential portion of the guiding bore of the pressure regulator piston. Either at the outer circumference of the control collar and the radial collar or along the inner circumferential surfaces of the guiding bore longitudinal notches are formed which permit a pressure fluid flow between the two spring chambers.

The pressure regulator piston is preferably designed to have a central control groove at the end faces of which the two control edges are formed. The pressure regulator piston is biased into its opened central position by two centering springs.

For tapping off the pressure in the pressure fluid flow path between the pressure regulator and the metering orifice the pressure regulator piston is designed to include one or more radial bores.

It is preferred that each of the flow valves includes a pressure feed valve by which the consumers are protected against overload from outside and moreover pressure fluid is fed, if there occurs a lack of fill so that the occurrence of cavitations is avoided and the system remains force-closed.

Further advantageous developments of the invention are the subject matter of further subclaims.

Hereinafter a preferred embodiment of the invention is illustrated in detail by way of schematic drawings in which FIG. 1 shows a functional diagram of a flow distributor in the operating state of "dividing";

Basically the concept according to the invention can be employed in hydrostatically driven machines having a closed or open hydraulic circuit, wherein a focus of application are rotational drives, for instance winch drives, belt drives or traveling drives.

Figure 1:
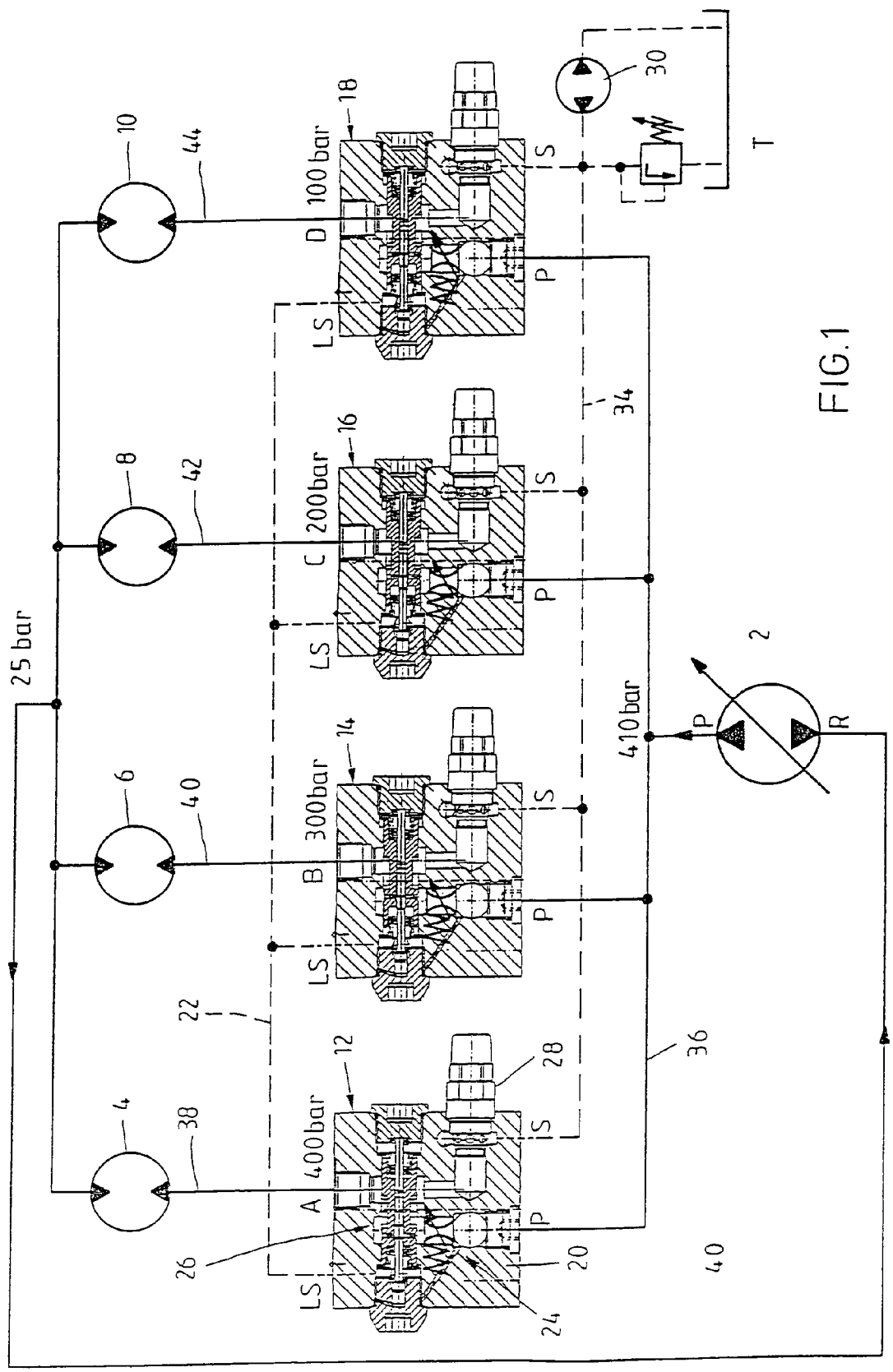

In FIG. 1 a functional diagram of a flow distributor for a traveling drive of a mobile working implement is shown. The control arrangement is a closed circuit and includes a variable-displacement pump 2. The traveling drive has four hydraulic motors 4, 6, 8, 10 supplied with pressure fluid by the pump 2.

The pressure fluid is distributed, in the shown embodiment, via flow valves 12, 14, 16, 18 each being allocated to one of the consumers 4, 6, 8, 10. The flow valves 12, 14, 16, 18 are valve segments and are combined into a control block.

As shown, by way of example, in the flow valve 12, each valve segment includes a housing washer 20 at which a pressure terminal P, a feed terminal S, a working terminal A (B, C, D) and a LS terminal LS are formed. The load-pressure terminals LS of the control arrangement 1 are interconnected via a LS line 22. In the housing washer 20 a variable metering orifice 24, a pressure regulator 26 and a pressure feed valve 28 are provided. The pressure regulator 26 is arranged downstream of the metering orifice 24 in the direction of flow toward the consumer 4. As mentioned in the beginning, the pressure drop above the variable metering orifice 24 is kept constant via the pressure regulator 26 independently of the load pressure so that the pressure fluid volume flows through the metering orifice 24 are only dependent on the opening cross-section thereof.

Via the pressure feed valve the pressure prevailing at the working terminal A (B, C, D) is restricted to a maximum value so that the consumer 4 (6, 8, 10) is protected against overload. Moreover, pressure fluid can be re-fed by the pressure feed valve 28 in a known manner in the case of a lack of fill, for instance during downhill driving or in the case of a pulling load, through the feed terminal S and, where appropriate, via a pump 30. In this case, pressure fluid is sucked by the latter from a tank T and is fed via a feed passage 34 to the respective feed terminal S of the flow valves 12, 14, 16, 18.

Figure 2:
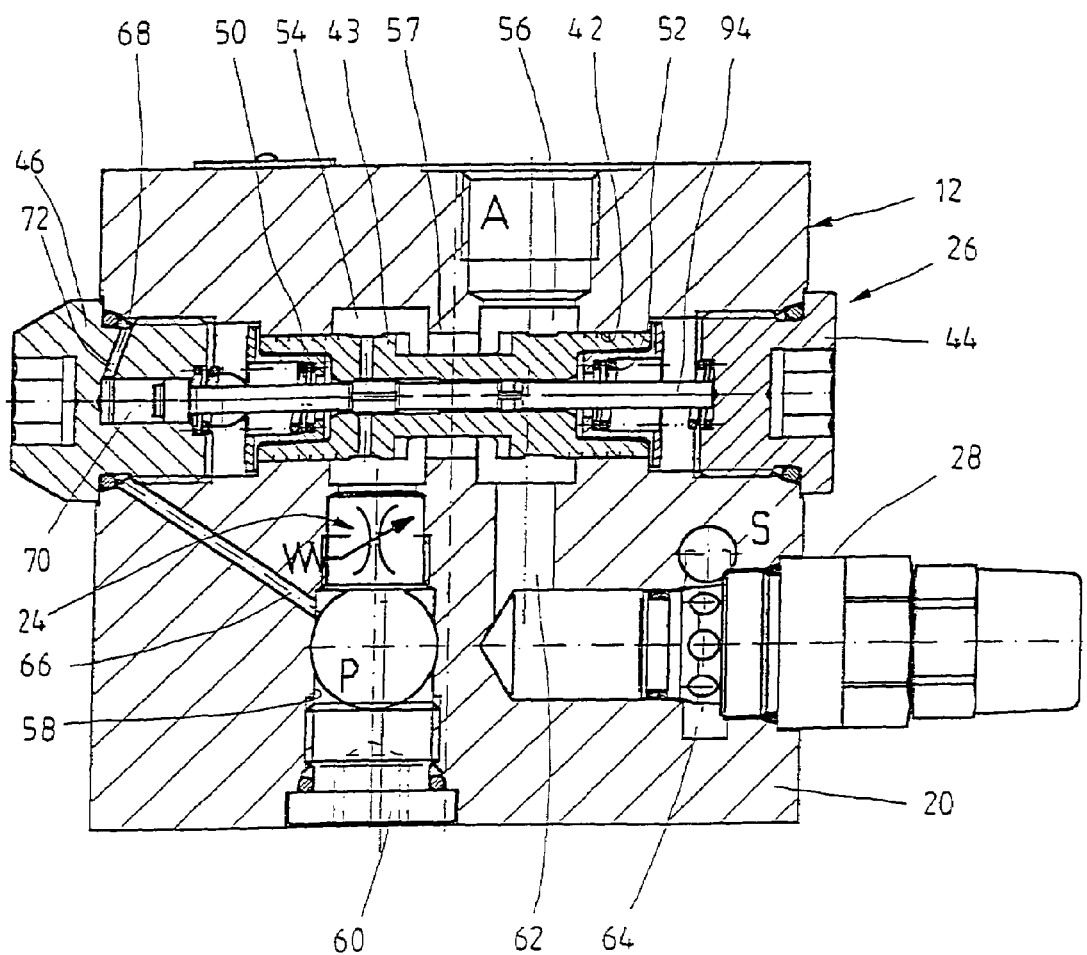
FIG. 2 shows a sectional view of a flow valve of FIG. 1.

The pressure terminal P of the variable-displacement pump 2 is connected to the pressure terminals P of the valve segments via a branching pressure or inlet passage 36. The respective working terminal A, B, C, D of the flow valves 12, 14, 16, 18 is connected to the pressure terminals of the consumers 4, 6, 8, 10 via an advance line 38, 40, 42, 44. The pressure fluid flows from the consumers via a joint reflux passage 40 to the suction terminal R of the variable-displacement pump 2. In FIG. 2 the flow valve 12 of FIG. 1 is shown enlarged. The other flow valves 14, 16, 18 show an identical structure.

In the representation according to FIG. 2, a pressure regulator bore 42 passes through the valve disk 20 in horizontal direction, the bore being closed at the end faces by a respective screw plug 44, 46. In the pressure regulator bore 24 a pressure regulator piston 43 which is biased into a central position via centering springs 50, 52 is guided to be axially movable. The pressure regulator bore 42 is extended in the central portion into two annular chambers 54, 56 between which an annular land 57 is retained. The annular chamber 56 is connected to the working terminal A, while a metering orifice bore 58 extending vertically in FIG. 2 opens into the annular chamber 54, with the metering orifice 24 being inserted in said bore. The structural design thereof is illustrated in a separate application in detail and is not important to the present invention. It is merely assumed that the metering orifice 24 has a variable cross-section. The invention is not restricted to such design, however.

The pressure terminal P extending perpendicularly with respect to the plane of projection in the embodiment shown in FIG. 2 opens into the metering orifice bore 58. The metering orifice bore 58 is closed to the bottom by a screw 60 (view according to FIG. 2).

In the annular chamber 56 moreover an angular bore 62 ends into the horizontally extending legs of which the pressure feed valve 28 having a cartridge design is screwed. The feed terminal S opens into a chamber 64 which constitutes a radial extension of the metering orifice bore 58 via a passage extending perpendicularly with respect to the plane of projection in FIG. 2.

The pressure terminal P is connected via an oblique passage 66 to an annular passage 68 which annularly encloses the outer circumference of the screwed plug 46. In the screwed plug 46 a pressure chamber 70 extending coaxially with respect to the pressure regulator bore 42 is formed which is connected via a connecting passage 72 to the annular passage 68 so that in the pressure chamber 70 constantly the pressure prevailing at the pressure terminal P, i.e. the pump pressure is applied.

Figure 3:
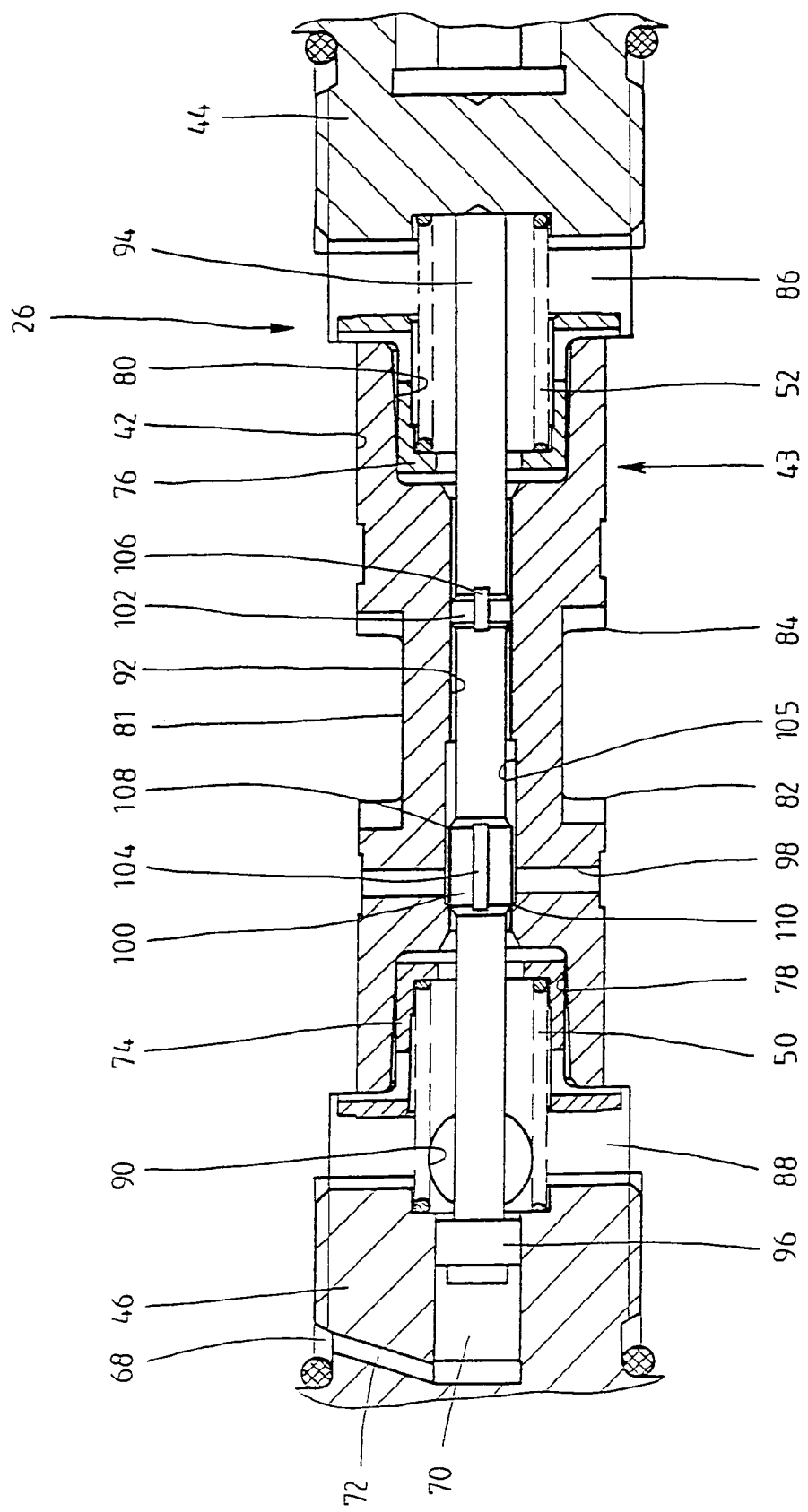
FIG. 3 is a detailed representation of a pressure regulator of the flow valve of FIG. 2.

The structure of the pressure regulator is explained by way of the enlarged representation in FIG. 3.

Accordingly, the centering springs 50, 52 of the pressure regulator piston 43 are supported on the neighboring screw plugs 46 and 44, resp., and act on the pressure regulator piston 43 via cup-shaped spring plates 74 and 76, resp., and, in so doing, immerse in portions in seats 78, 80 at the end faces of the pressure regulator pistons 43 so that the pressure regulator has a short dimension in axial direction.

In the central area of the pressure regulator piston 43 a circumferential control groove 81 is provided at the circumferential side, the annular end faces thereof forming two control edges interacting with the annular land 57. The control edge on the left in FIG. 3, hereinafter referred to as "dividing" control edge 82, is active during "dividing" and the right one, hereinafter referred to as "accumulating" control edge 84, is active during "accumulating". According to FIG. 2, the two control edges 82, 84 are in the shown home position at a distance from the annular land 57 so that the pressure fluid connection from the working terminal A (B, C, D) to the metering orifice bore 58 and thus to the pressure terminal P is opened.

The centering spring 52 is arranged in a spring chamber 86 which is confined at the end face by the pressure regulator piston 43 and by the screw plug 44. The other end portion of the pressure regulator piston 43 confines, jointly with the screw plug 46, a LS spring chamber 88 into which the load-indicating terminal LS opens via a passage 90 extending perpendicularly with respect to the plane of projection.

Accordingly, in the LS spring chamber 88 of all flow valves 12, 14, 16, 18 the same pressure is applied which during "dividing" approximately corresponds to the maximum load pressure and during "accumulating" approximately corresponds to the minimum load pressure of the consumers.

According to FIG. 3, a guide bore 92 in which an internal piston 94 is guided to be axially movable passes through the pressure regulator piston 43 in axial direction. The internal piston passes with its left end portion through the LS spring chamber 88 and there includes a guiding collar 96 for sealingly guiding it in the pressure chamber 70 of the screw plug 46.

The other end portion extends into the spring chamber 86 and in its shown end position is supported on the screw plug 44. When moving the internal piston 94 to the left, its left end portion abuts against the bottom of the pressure chamber 70 so that the end positions are confined by abutting against the respective screw plugs 44 or 46.

On the left from the control groove 81 in the pressure regulator piston 43 at least one of radial bores 98 is formed which opens, on the one hand, into the guide bore 92 and, on the other hand, into the annular chamber 54. In the area of said radial bores 98 a radially projecting control collar 100 is formed at the internal piston 94. At a distance on the right from the latter a radial collar 102 is provided via which the internal piston 94 is guided in the guide bore 92. The portions of the internal piston 43 adjacent to the collars 100, 102 have a smaller diameter and form an annular chamber with the inner circumferential surface of the guide bore 92. As represented in FIG. 3, the control collar 100 and the radial collar 102 are provided with longitudinal notches 104, 106 so that a control oil flow along said annular gaps and the longitudinal notches 104, 106 between the spring chambers 86, 88 is possible. On the right from the radial bores 98 the guide bore 92 is radially extended into a portion 105 which forms an annular gap along with the outer circumference of the control collar 100.

At the annular end faces of the control collar 100 LS control edges 108, 110 are formed, wherein the control edge 110 acts on the flow valve of the maximum load pressure consumer during "dividing" and the LS control edge 108 of the flow valve allocated to the minimum-load consumer is active during "accumulating".

Concerning a further explanation of the function, it is first of all assumed that the control arrangement 1 is operated in the operating state of "dividing". According to FIG. 1, the load pressure of the consumer 4 is to amount to 400 bar, the load pressure at the consumer 6 is to be 600 bar, the load pressure at the consumer 8 is to be 200 bar and the load pressure at the consumer 10 is to be 100 bar, accordingly a pump pressure is built up by swiveling the pump which consequently supplies 410 bar (in the case of a "10 bar metering spring"). Said pump pressure (410 bar) is applied through the passage 66 also in the pressure chamber 70 so that the left end face of the internal piston is loaded with the pump pressure, while a lower pressure, as described hereinafter the pressure prevailing in the pressure chamber 54, acts on its right end face. In the illustrated embodiment, above the metering orifice 24 of the flow valve 12 a pressure of 10 bar drops, the pressure drop above the pressure regulator 26 is negligible in the central position. The pressure prevailing at the outlet of the metering orifice 24 acts on the right end face of the internal piston 43. This pressure corresponds in the open position of the pressure regulator 26 to the maximum-load pressure, i.e. the pressure prevailing at the working terminal A. By way of the difference in pressure (pump pressure minus maximum load pressure) the internal piston 94 is moved to the right into the position shown in FIG. 3 in which it is adjacent to the screw plug 44 with its right end portion. In this position the LS control edge 110 of the control collar 100 opens a LS cross-section through which the radial bores 98 are connected to the spring chamber 88 so that the pressure prevailing in the annular chamber 54 is also applied to the spring chamber 88. That is to say, this pressure of 400 bar (maximum load pressure) is indicated via the LS line 22 also into the pressure chambers 88 of the other flow valves. The internal pistons 94 of the other pressure regulators 26 allocated to the lower-load consumers are likewise shifted to the right into the end position shown in FIG. 3 by the high pump pressure.

Figure 4:
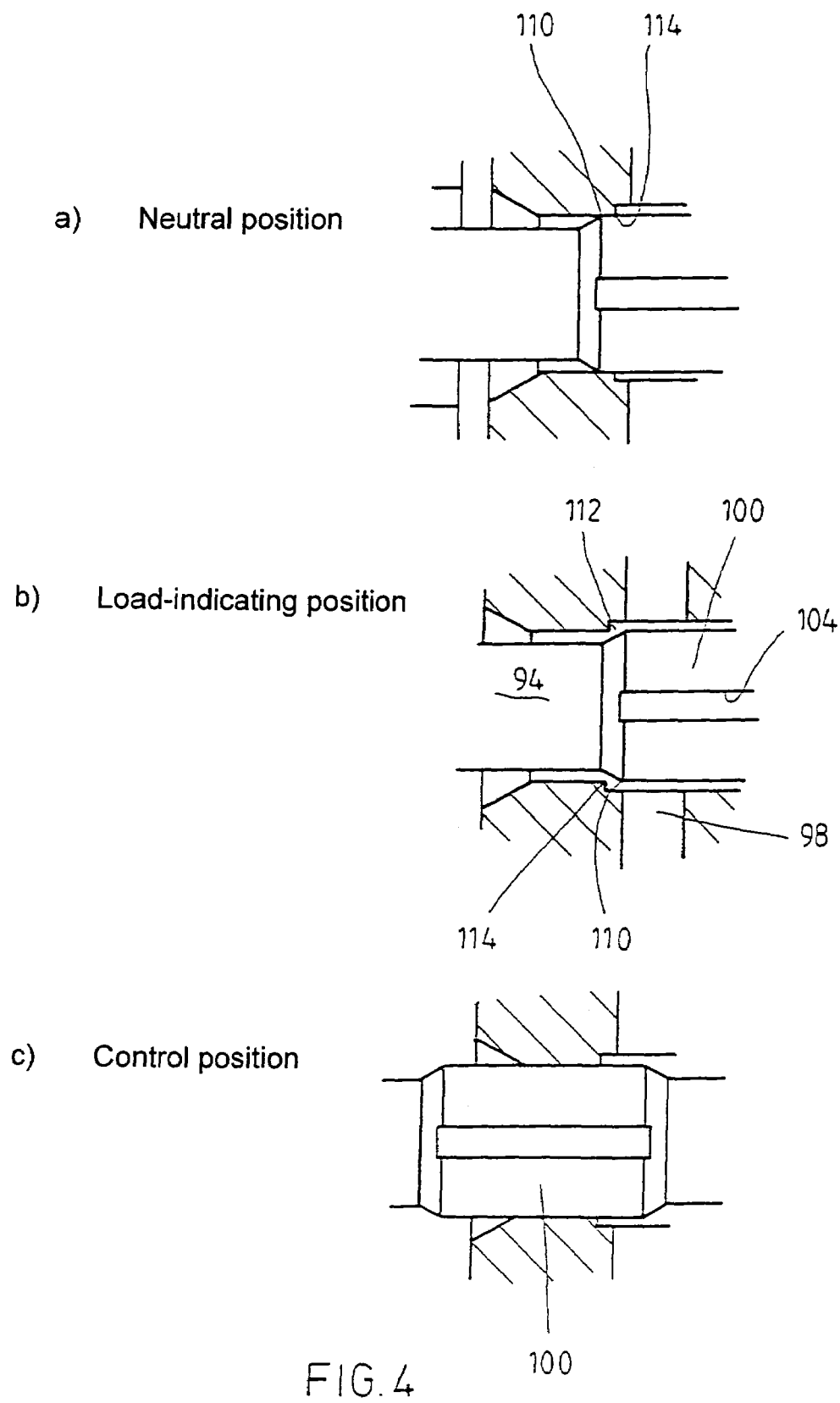
FIG. 4 shows an internal piston of the pressure regulator of FIG. 3 in different operating positions during "dividing"

For the purpose of better comprehension, in FIG. 4 the area of the internal piston 94 provided with the control edge 110 and the adjacent areas of the pressure regulator piston 43 are shown. FIG. 4b) illustrates the afore-described load-indicating position of the pressure regulator 26 of the maximum-load consumer 4 in which the maximum load pressure (400 bar) is indicated into the LS line 22. As mentioned before, in the central position of the pressure regulator piston 43 and in the right end position of the internal piston 94 the control edge 110 of the control collar 100 controls a LS cross-section 112 to be opened for load indication so that in the spring chamber 88 the respective load pressure, and more exactly speaking the pressure prevailing at the outlet of the metering orifice 24 is applied. This pressure is indicated via the afore-described annular gap including the radially extended portion 105 and the longitudinal notch 106 also into the right spring chamber 86 so that the pressure regulator piston 43 of the flow valve 12 is pressure-compensated at the end face and remains in its central position—thus the pressure regulator 26 of the maximum load pressure consumer is completely opened and does not restrict the pressure fluid volume flow.

Figure 5:
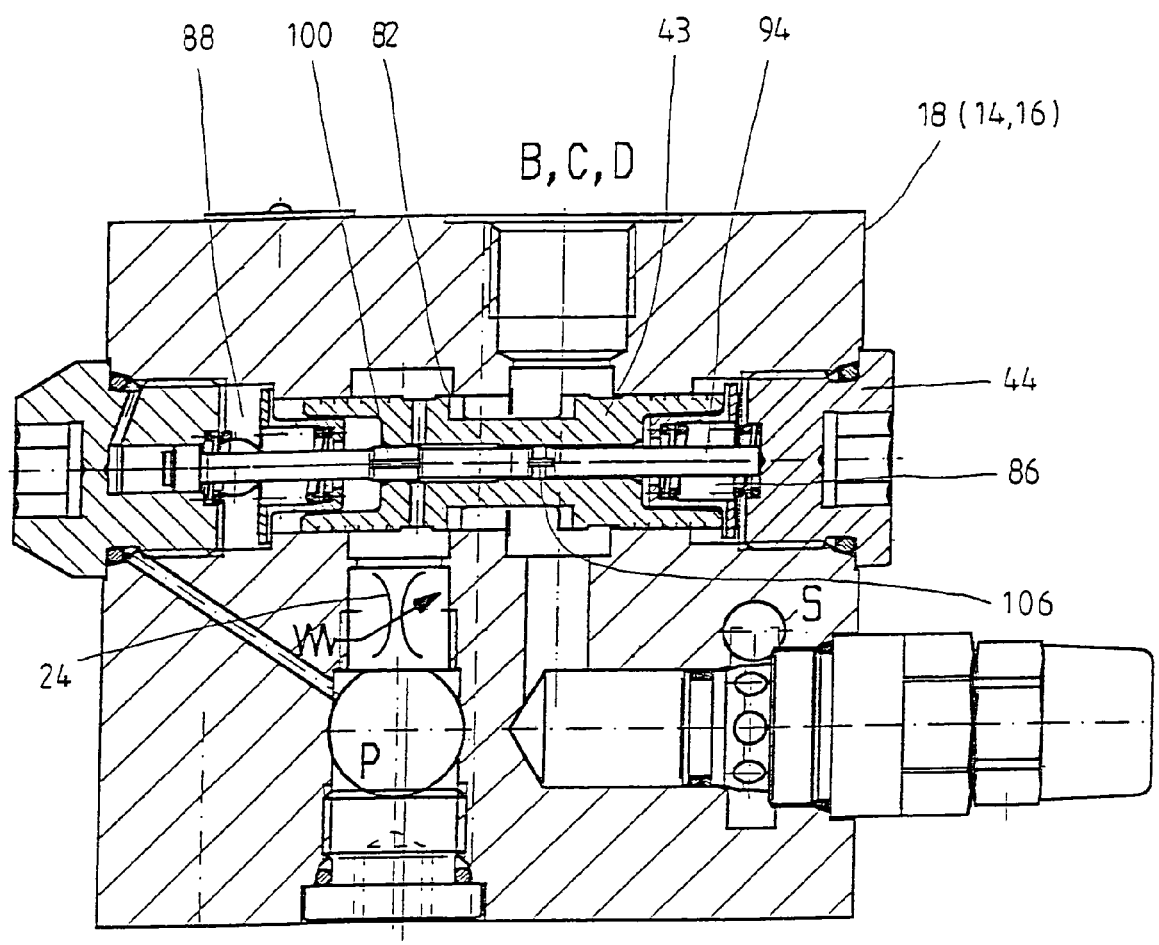
FIG. 5 shows the flow valve of a lower-load consumer during "dividing"

FIG. 5 shows, by way of example, a control position to be adopted by the flow valves 14, 16, 18 of the lower-load consumers 6, 8, 10 which are connected to the corresponding working terminals B, C and D. As described in the foregoing, the internal piston 94 is also adjacent to the screw plug 44 in its right end position in the case of the flow valves 14, 16, 18 of the lower-load consumers. In so doing, the signal of the pressure regulator 26 of the flow valve 12 is indicated into the spring chambers 88 of the flow valves 14, 16, 18 so that the maximum load pressure of 400 bar is likewise applied to the spring chambers 88. At the beginning of control the pressure fluid initially flows to the consumers having the lowest hydraulic resistance—during dividing to the lower-load consumers. Consequently, the pressure regulator pistons 43 of the flow valves 14, 16, 18 are shifted to the right from the central position against the force of the centering spring 52 due to the maximum load pressure acting in the LS spring chamber 88 and, accordingly, the flow cross-section between the pressure regulator piston 43 and the annular land 57 is controlled to be closed by the "dividing" control edge 82 so that the pressure fluid flow is restricted. The pressure fluid flow is restricted until a balance of forces is provided at all pressure regulators and the amounts flow to the consumers independently of the load. This means in the present example that the pressure regulator of the minimum-load consumer closes to a relatively great extent, whereas the pressure regulators of the two higher-load consumers (200 bar, 300 bar) adopt intermediate positions between the neutral position shown in FIG. 4a and the position of small flow cross-section shown in FIG. 5. By shifting the pressure regulator piston 43 to the right vis-à-vis the internal piston 94 which is adjacent to the screw plug 44, according to FIG. 4 the LS cross-section 112 is controlled to be closed via the control edge 110 of the internal piston 94 and the allocated control edge 114 fixed to the housing so that the connection between the radial bores 98 and the LS spring chamber 88 is interrupted (see neutral position FIG. 4a). In its control positions shown in FIG. 4c) the control collar 100 is located approximately in the area in which the land between the spring chamber 88 and the radial bores 98 is formed. The pressure prevailing at the outlet of the metering orifice 24 is then indicated into the spring chamber 86 via the radial bores 98, the annular gap confined by the portion 105 of the guide bore, the connected annular gap between the outer circumference of the internal piston 94 and the inner circumferential wall of the guide bore 92 as well as via the longitudinal notch 106 of the radial collar 102 so that the pressure regulator piston 43 is loaded on the left with the maximum load pressure and on the right with the pressure downstream of the metering orifice 24.

The small longitudinal notches 104 and 106 of the internal piston as well as the annular chamber between the internal piston 94 and the guide bore in addition have the function that control oil can be displaced from the reducing spring chamber via this control oil flow path during a control motion of the pressure regulator piston 43. A displacement of the control oil from the LS spring chamber 88 through the LS line 22 is not always sufficient in this case and, moreover, is not always fast enough, for instance in the case of an exchange of the pressure regulator of the most extreme load pressure.

Figure 6:
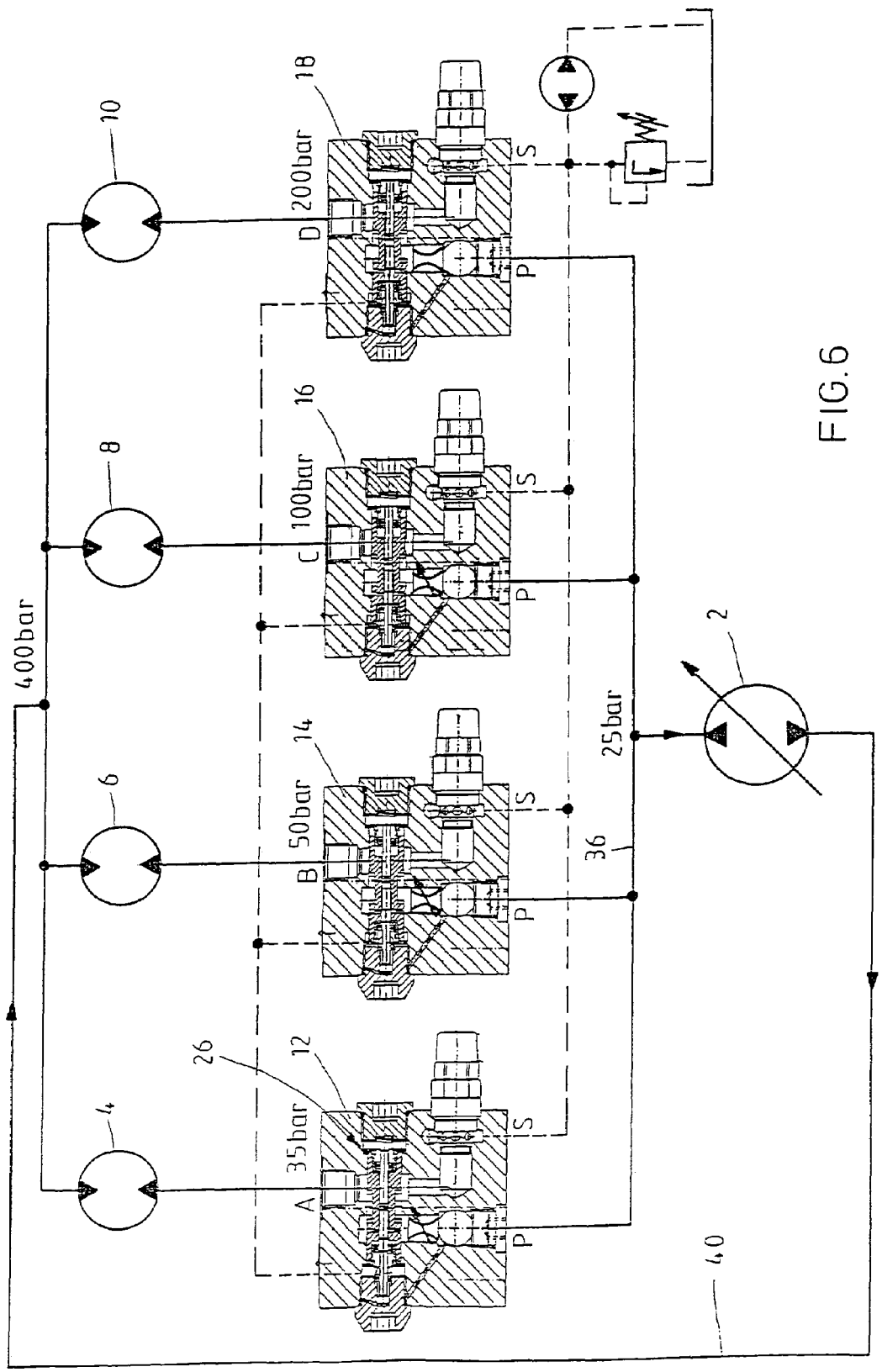
FIG. 6 shows the functional diagram according to FIG. 1 in the operating state of "accumulating"

FIG. 6 shows the functional diagram corresponding to FIG. 1 for the operating state of "accumulating". It is assumed that a load pressure of 35 bar prevails at the minimum load pressure consumer 4, while the load pressure of the other consumers is 50, 100 and 200 bar, respectively. The pressure fluid volume flows to be accumulated at the inlet P of the variable-displacement pump 2 have a pressure of 25 bar, whereas in the reflux line 40 (actually serving as supply line) leading from the terminal R to the consumers 4, 6, 8, 10 a pressure of 400 bar is applied.

By reason of the low pressure in the supply line 36 (25 bar) the internal piston 94 is shifted to the left by the higher pressure acting on its right end face until it is adjacent with its left end face to the bottom of the pressure chamber 70 of the screw plug 46. This change-over takes place in all flow valves 12, 14, 16, 18 according to FIG. 6.

Figure 7:
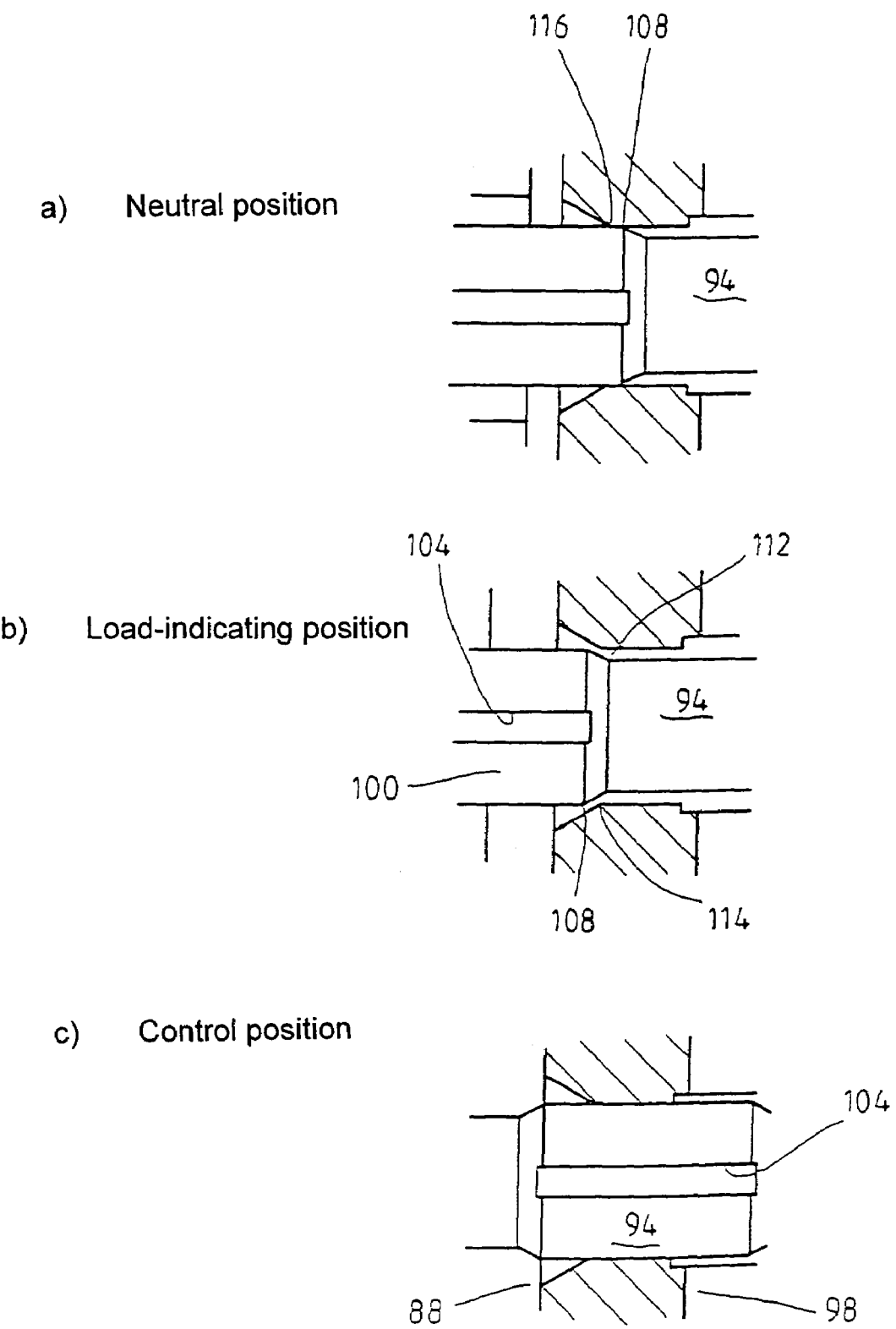
FIG. 7 shows positions of the internal piston according to FIG. 4 during "accumulating"
Figure 8:
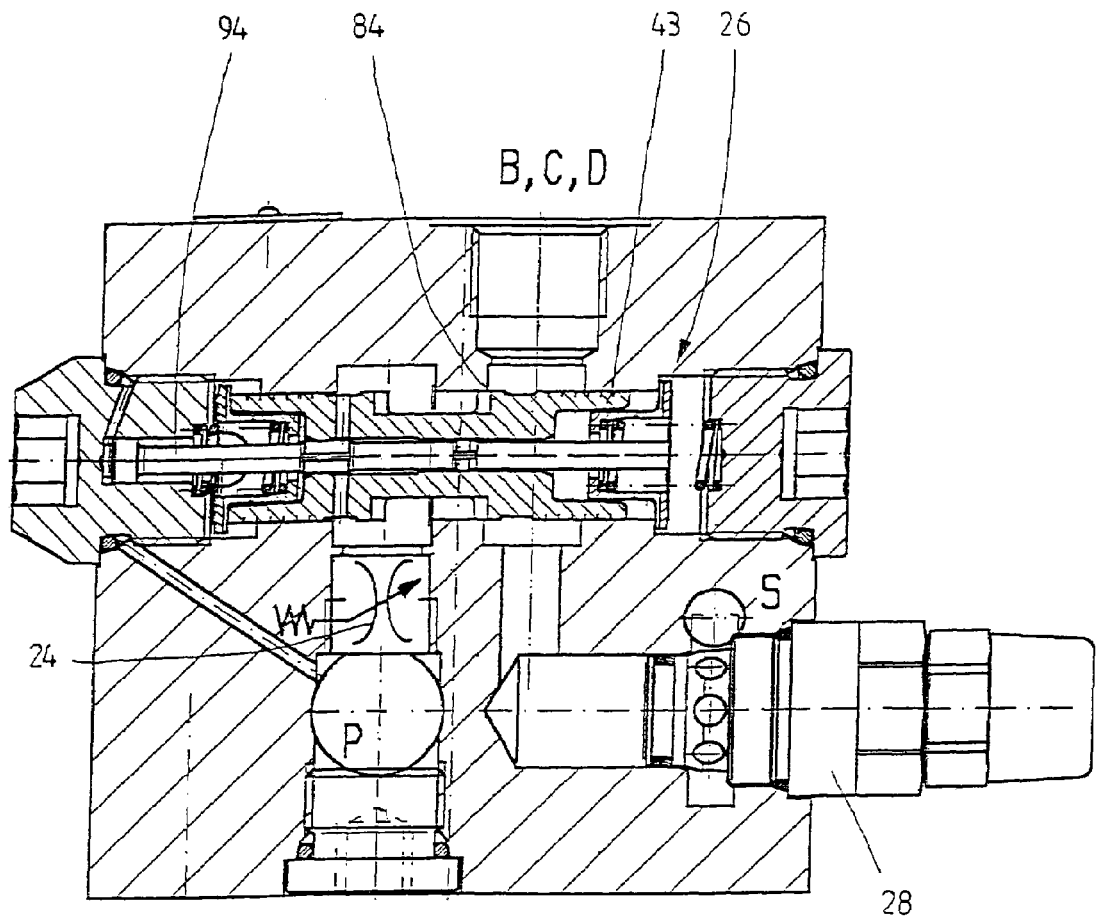
FIG. 8 is a sectional view of a flow valve of a lower-load consumer.

At the beginning of the control, the pressure fluid flows to the pressure regulators of the consumers having the lowest hydraulic resistance—upon accumulating these are the higher load consumers so that the pressure regulators thereof are the first to react. The pressure regulator 26 of the minimum-load consumer 4 remains in or moves into its central position. The axial length of the control collar 100 is selected such that by shifting the internal piston 94 vis-à-vis the pressure regulator piston 43 to the left the right LS control edge 108 becomes active. This is represented in FIG. 7b. In this load-indicating position of the pressure regulator 26 allocated to the minimum-load consumer (internal piston 94 shifted to the left, pressure regulator piston 43 in its central position) the LS control edge 108 opens a LS cross-section 112 which is restricted at the housing side by a control edge 114 at the spring chamber side. Via the opened LS cross-section 112 the connection between the pressure chamber 54 and the LS spring chamber 88 is opened so that the minimum load pressure (35 bar) is indicated into the LS line 22 and thus is applied to all LS spring chambers of the flow valves 12, 14, 16, 18. This minimum load pressure also acts on the right end face of the pressure regulator piston 43 of the flow valve 12 so that the latter remains in its central position. As shown in FIG. 8, by the pressure fluid flow to the other pressure regulators of the higher-load consumers the pressure regulator pistons 43 thereof are shifted to the left into a control position (also see FIG. 7c). In this control position the opening cross-section of the pressure regulators 26 of the higher-load consumers 14, 16, 18 is varied by the "accumulating" control edge 84 and the pressure fluid flow is restricted until a balance of forces is reached. Thus, the pressure fluid can flow back from the consumers independently of the load, wherein the pressure drop is kept constant above the respective metering orifices 24. Depending on the load pressure prevailing at the higher load pressure consumers, the pressure regulator piston 43 in its balanced position adopts a relative position with respect to the internal piston 94 which is between a neutral position (FIG. 7a)) and the shown control position (FIG. 7c)). In the neutral position according to FIG. 7a the LS cross-section is closed by the control edges 108, 114, whereas in the represented control position the control collar 94 is positioned in the area of the land between the radial bores 98 and the LS spring chamber 88 by axial displacement of the pressure regulator piston 43 from the neutral position to the left.

Figure 9:
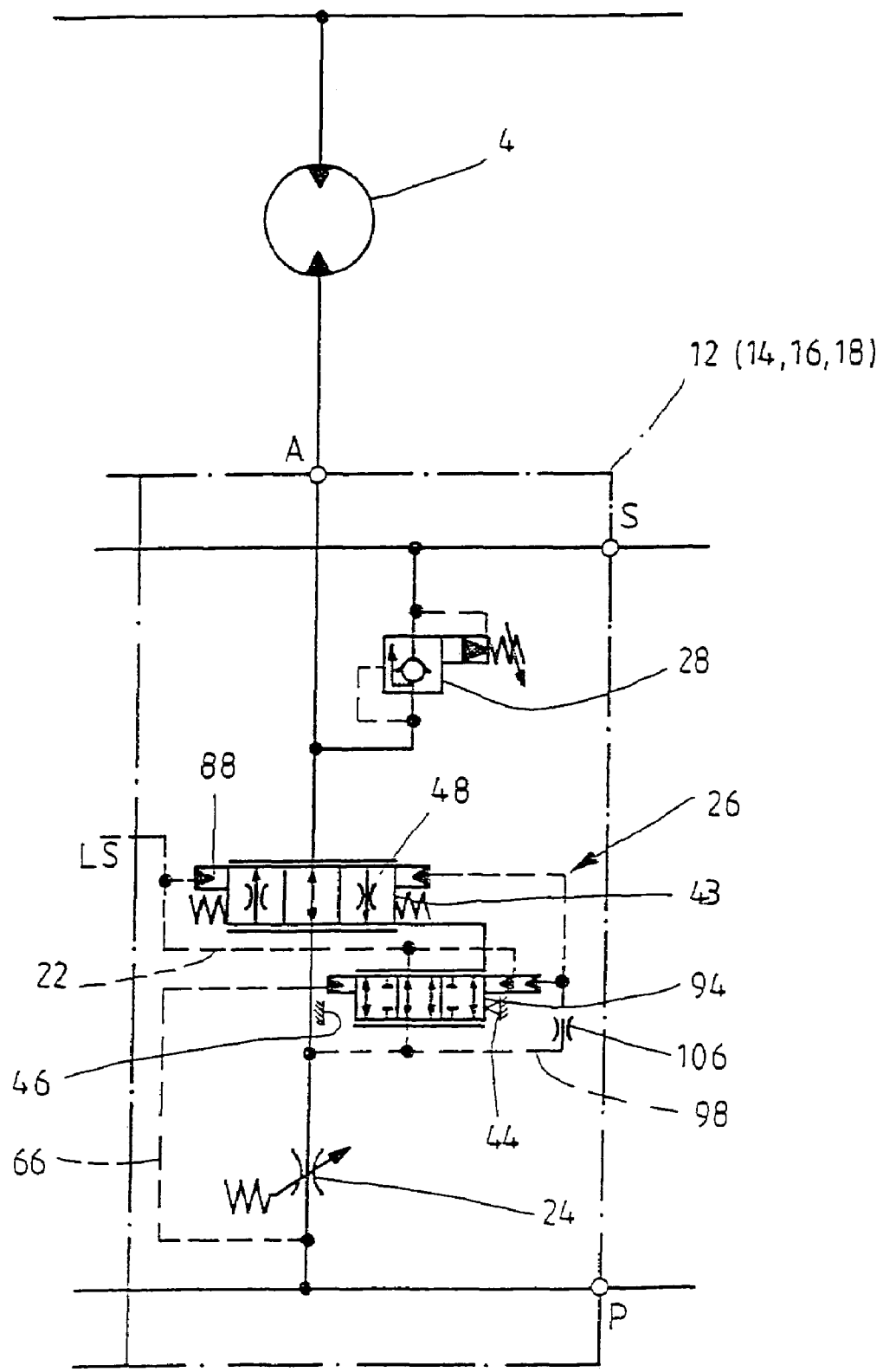
FIG. 9 is a circuit symbol of a flow valve according to the invention.

In FIG. 9 the circuit symbol of the flow valves according to the invention is shown. The valve segment allocated to the consumer 4, for instance, is indicated by a dot-dash line and includes the terminals P, S, A and LS. In the valve segment the pressure feed valve 28, the variable metering orifice 24 and the pressure regulator 26 are shown with the 2/2 port directional control valve which is constituted by the internal piston 94 guided in the pressure regulator piston 43 in the concrete solution. As indicated in FIG. 9, this internal piston is mechanically connected to the pressure regulator 26. The pump pressure tapped off via the oblique passage 66 acts on the left end face of the internal piston 94, while the pressure tapped off via the radial bores 98 prevailing in the pressure fluid flow path between the metering orifice 24 and the pressure regulator 26 acts on the right end face. During "dividing" the internal piston 94 is moved against a stop fixed to the housing, in the present case the screw plug 44, during "accumulating" the internal piston 94 is adjacent to the stop formed by the screw plug 46.

In the open home position of the pressure regulator 26 the pressure prevailing between the metering orifice 24 and the pressure regulator 26 is indicated via the internal piston 94 and the appropriately switched 2/2 port directional control valve into the LS spring chamber 88 and thus into the LS line 22 and, consequently, is applied to all LS spring chambers 88 of the flow valves. When shifting the pressure regulator from the open position into a control position, the internal piston 94 is moved by the mechanical coupling into one of the shown locking positions so that the pressure prevailing in the pressure fluid flow path from the metering orifice 24 to the pressure regulator 26 can no longer be tapped off via the 2/2 port directional control valve (internal piston 94). The pressure prevailing in the LS line 22 is also applied to the end face of the internal piston 94 on the right in FIG. 9.

The pressure regulator piston 43 is loaded, on the one hand, with the pressure in the LS passage 22 and, on the other hand, with the pressure tapped off via the longitudinal notch 106 between the metering orifice 24 and the pressure regulator 26, wherein in the case of a balance of forces the pressure fluid volume flow is restricted by the pressure regulator 26 so that the pressure drop above the metering orifice 24 is constant independently of the load.

As mentioned already, at the beginning of a control the respective pressure regulator 26 which is allocated to the consumer having the minimum hydraulic resistance and which, accordingly, receives the largest amount of pressure fluid at the beginning is the first to react. In the case of "dividing" this is the pressure regulator allocated to the minimum-load consumer, whereas in the case of "accumulating" the pressure regulator allocated to the maximum-load consumer is the first to react.

There is disclosed a flow valve and a flow distributor for the pressure fluid supply of several consumers. Each flow valve includes a metering orifice and a pressure regulator. A pressure regulator piston of the pressure regulator is provided with two control edges one of which is active during "accumulating" of pressure fluid flows and the other is active during "dividing" of a pressure fluid flow. The flow valve moreover comprises at least one LS control edge by which a LS cross-section via which a pressure corresponding to the load pressure is indicated into a load-indicating line can be controlled to be opened when the pressure regulator is opened.

LIST OF REFERENCE NUMERALS

1 Flow distributor
2 variable-displacement pump
4 hydraulic motor
6 hydraulic motor
8 hydraulic motor
10 hydraulic motor
12 flow valve
14 flow valve
16 flow valve
18 flow valve
20 housing washer
22 LS line
24 metering orifice
26 pressure regulator
28 pressure feed valve
30 pump
32 feed passage
34 feed line
36 supply line
38 advance line
40 reflux line
42 pressure regulator bore
43 pressure regulator piston
44 screw plug
46 screw plug
50 centering spring
52 centering spring
54 annular chamber
56 annular chamber
57 annular land
58 metering orifice bore
60 screw
62 angular bore
64 chamber
66 oblique passage
68 annular passage
70 pressure chamber
72 communicating passage
74 spring plate
76 spring plate
78 seat
80 seat
81 control groove 82 dividing control edge
84 accumulating control edge
86 spring chamber
88 LS spring chamber
90 passage
92 guide bore
94 internal piston
96 guiding collar
98 radial bores
100 control collar
102 radial collar
104 longitudinal notch
105 radially extended portion
106 longitudinal notch
108 LS control edge
110 LS control edge
112 LS cross-section
114 control edge fixed to the casing
116 control edge at the spring chamber side

The invention claimed is:

1. Flow valve for a flow distributor for the pressure fluid supply of several hydraulic consumers comprising a pressure regulator and a metering orifice which can be flown through for dividing a flow in the direction of the consumer and for accumulating pressure fluid flows in the opposite direction, wherein the pressure regulator includes a pressure regulator piston biased into a home position to which, on the one hand, pressure prevailing in a LS line can be applied and, on the other hand, pressure prevailing in the pressure fluid flow path between the metering orifice and the pressure regulator can be applied, characterized in that the pressure regulator piston includes two control edges one of which is active during accumulating and the other is active during dividing and that, moreover, at least one LS control edge is provided by which, when the pressure regulator is opened, for load-indicating into the LS line a LS cross-section can be controlled to be opened for tapping off the pressure prevailing in the pressure fluid flow path.

2. Flow valve according to claim 1, wherein the pressure regulator is opened in the home position.

3. Flow valve according to claim 1, wherein a LS control edge is active during accumulating and another LS control edge is active during dividing and these control edges are formed by a 2/2 port directional control valve.

4. Flow valve according to claim 3, wherein the 2/2 port directional control valve is formed by an internal piston guided in a guide bore of the pressure regulator piston and including a control collar at the two annular end faces of which the two LS control edges are arranged.

5. Flow valve according to claim 4, wherein the pump pressure can be applied to one end face of the internal piston and a pressure corresponding to the load pressure can be applied to the other end face.

6. Flow valve according to claim 4, wherein the LS line opens into a LS spring chamber of the pressure regulator and wherein the LS cross-section between the LS spring chamber and a passage of the pressure regulator piston guiding the load pressure can be controlled to be opened via the LS control edges of the control collar.

7. Flow valve according to claim 6, wherein the LS spring chamber is communicated via a communicating passage extending between the internal piston and the guide bore with a spring chamber into which a radially set-back end portion of the internal piston immerses and there is movable against a stop.

8. Flow valve according to claim 7, wherein another end portion of the internal piston passes through the LS spring chamber and is guided by a guiding collar in a pressure chamber of a screw plug to which the pump pressure is applied and which includes an axial stop for the internal piston.

9. Flow valve according to claim 7, wherein the internal piston includes a radial collar for guiding the internal piston in the guide bore and wherein longitudinal notches are formed at the radial collar and at the control collar and adjacent areas of the internal piston are designed to have radial play for forming a communicating passage.

10. Flow valve according to claim 1, wherein the pressure regulator piston includes a central control groove at the annular end faces of which the two control edges are formed and wherein the pressure regulator piston is biased into a central position via two centering springs.

11. Flow valve according to claim 10, wherein the pressure regulator piston has at least one radial bore opening, on the one hand, in the area of the control collar into the guide bore and, on the other hand, into a chamber guiding the load pressure.

12. Flow valve according to claim 1, comprising a pressure feed valve.

13. Flow distributor for the pressure fluid supply of several consumers having several flow valves according to claim 1.

* * * * *